April 21, 1931.　　　H. A. MONTEITH　　　1,801,522
VEHICLE BRAKE
Filed May 20, 1927　　3 Sheets-Sheet 1
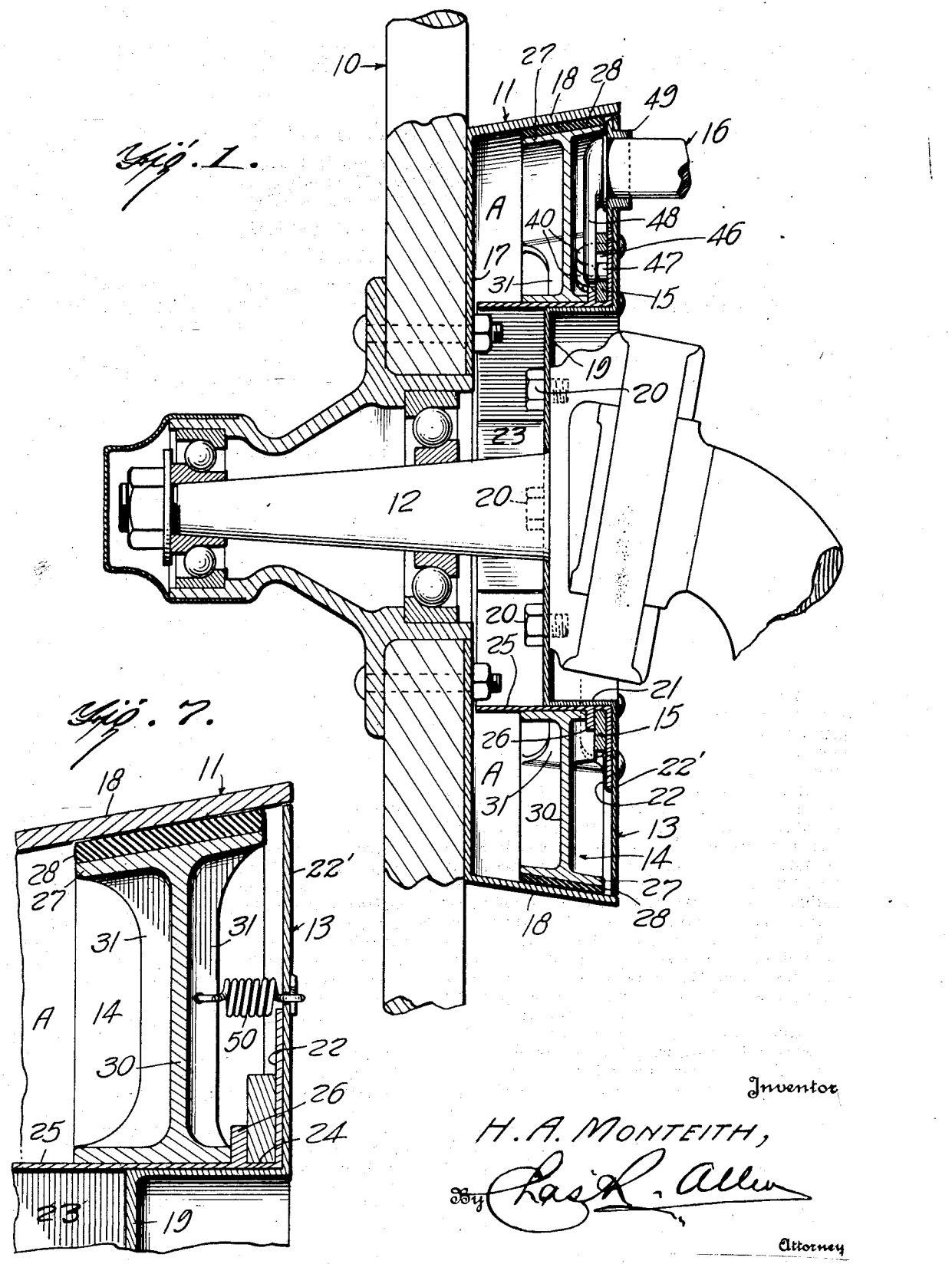
Inventor
H. A. MONTEITH,
By Chas. R. Allen
Attorney

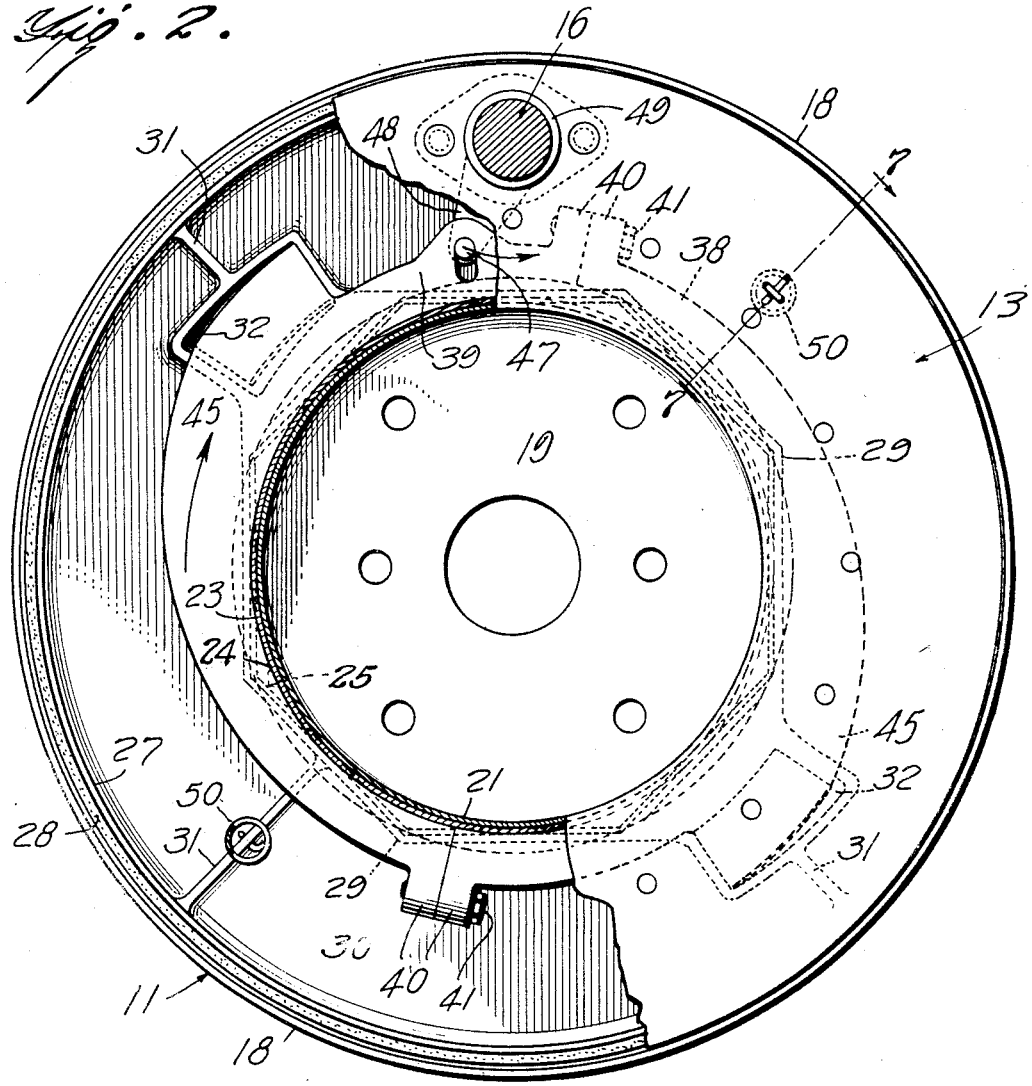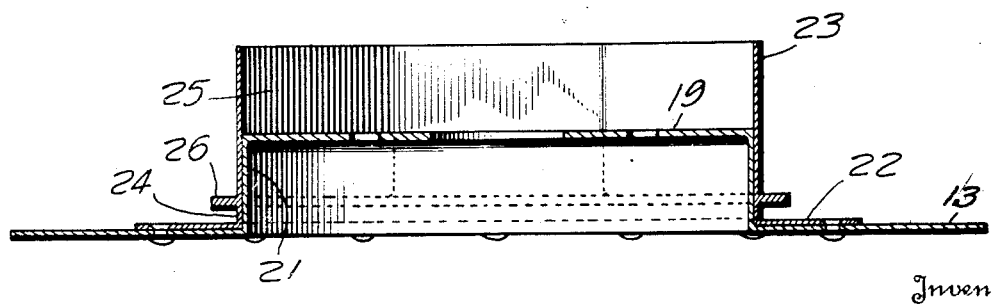

April 21, 1931. H. A. MONTEITH 1,801,522
VEHICLE BRAKE
Filed May 20, 1927 3 Sheets-Sheet 3

Inventor
H. A. Monteith,
By Chas R Allen
Attorney

Patented Apr. 21, 1931

1,801,522

UNITED STATES PATENT OFFICE

HOWARD A. MONTEITH, OF WEST PALM BEACH, FLORIDA

VEHICLE BRAKE

Application filed May 20, 1927. Serial No. 193,015.

Skidding, usually caused by unequal brake pressure, burning out of the brake linings, necessity for the continuous adjustment of the many brake connections, and the lack of sensitiveness of the brakes in responding instantly in an emergency are unquestionably the greatset causes for the rapidly increasing number of motorcar fatalities.

With a view of overcoming these and other objections and faults in brakes for motor vehicles, I have provided a brake which is constructed of a comparatively few parts and my invention further resides in an extremely simple and inexpensive device, which readily lends itself to high production basis, which may be easily placed upon or removed from the wheels, and when it has been placed in its position requires no adjustment with the minimum amount of attention.

The scope of my invention extends to whatever constructions may be defined by or included within the terms or language of the appended claims.

In the drawings:—

Figure 1 is a central longitudinal section taken through one of the front wheels illustrating my invention in position;

Figure 2 is a face view thereof showing a portion of the plate as broken away;

Figure 3 is a horizontal sectional view taken through the plate;

Figure 7 is a detailed sectional view taken on the line 7—7 of Figure 2.

Figure 4:
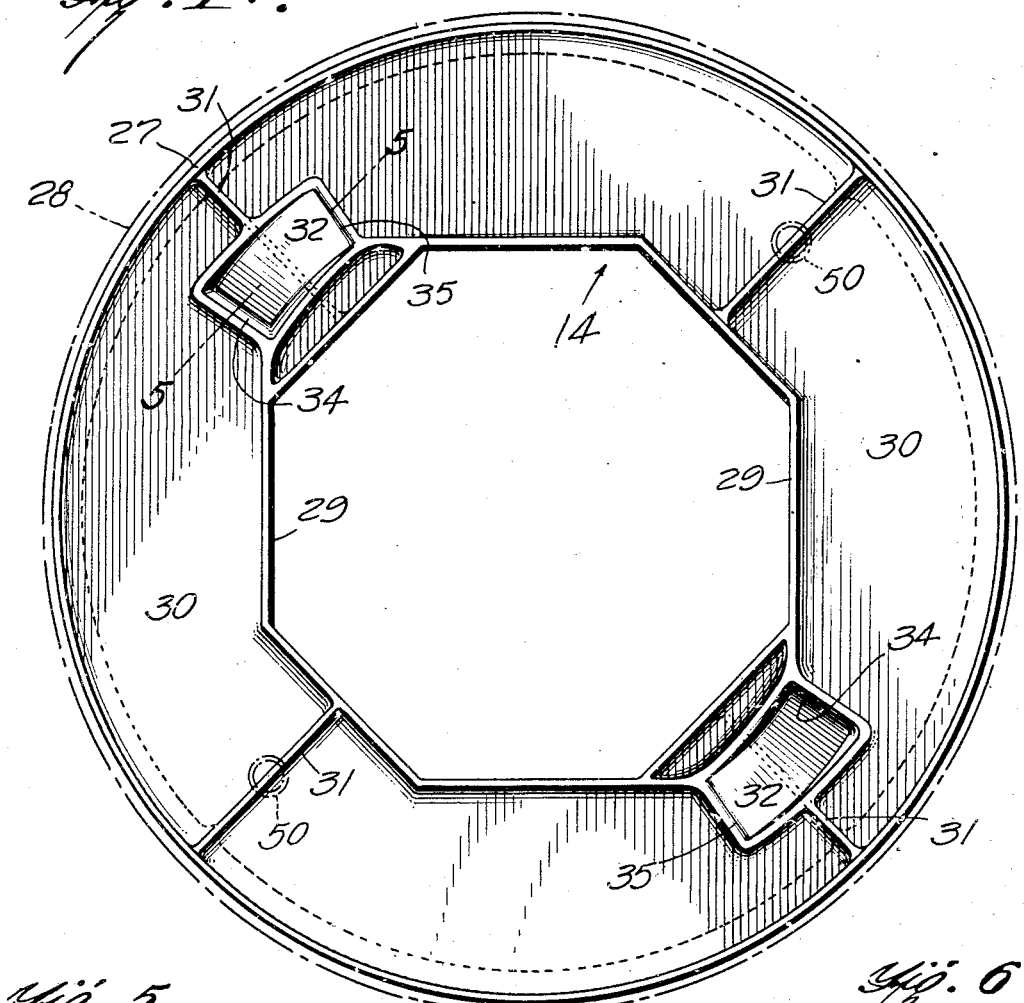
Figure 4 is a face view of the brake drum.

My invention in the form or embodiment shown in the drawings and briefly described comprises the vehicle wheel, 10, a brake drum, 11, carried thereby, an axle, 12, an inner drum, 13, carried by the axle, a slidably mounted brake shoe, 14, a movably mounted cam ring, 15, and an actuating member therefor, indicated at 16.

The spokes of the wheel are connected at their lower ends to the flange of the hub in the usual manner on the outer side thereof and the same bolts for securing these members may be utilized for securing the plate, 17, cf the brake drum, 11, as is clearly shown in Figure 1. The outer rim 18 of the brake drum is substantially conical in shape and may be cast integrally or otherwise formed.

The plate, 19, of the inner drum, 13, is secured by bolts, 20, to the axle, 12, and is provided with an inwardly extending substantially cylindrical rim, 21, of a diameter approximating one-half of the diameter of the brake drum, 11. Integrally formed with the rim, 21, is the outwardly extending disk or plate, 22', whose outer diameter is of the same approximate size as the inner surface of the brake drum, 18.

Secured to the plate, 13, of the inner drum by riveting or any other suitable manner, is a disk, 22, which is provided with a lateral extending portion, 23. The portion, 23, which is concentric with respect to the axle, 12, is provided with a circular portion, 24, and polygonal surfaces, 25. The circular portion, 24, is preferably machined between the disk, 22, and the rim or flange, 26, for a purpose to be hereinafter described.

Since the edge of the polygonal portion 25, is substantially close to the plate, 17, of the brake drum, 11, it will be readily seen that a relatively large annular chamber or space is provided between the plate, 17 and disk 22, of the brake drum and inner drum respectively and bounded along its outer edge by the rim, 18, and the polygonal portion, 25, of the inner drum. Brakes of this type are subject to heating very rapidly upon application especially when the brakes are applied steadily for any length of time, as for example when going down grade. It will be readily seen then that the provision of a substantially large annular space will materially prevent this overheating.

Figure 5:
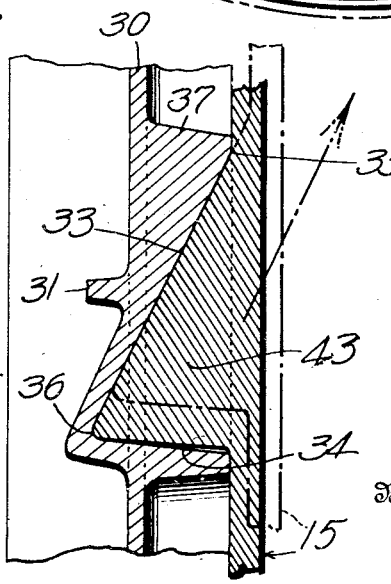
Figure 5 is a detailed sectional view taken on the line 5—5 of Figure 4 more clearly illustrating the cam action.
Figure 6:
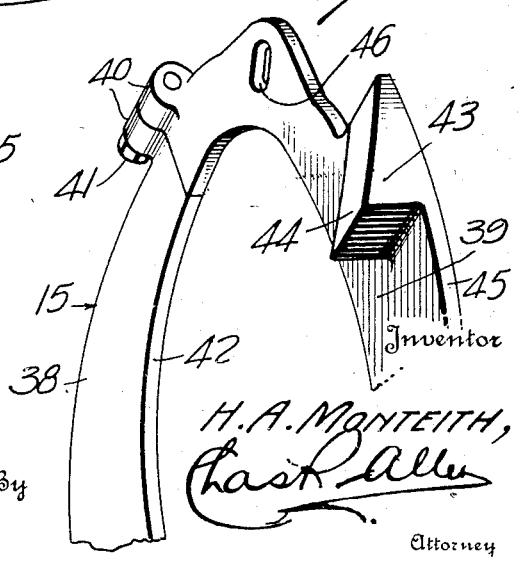
Figure 6 is a fragmentary perspective of the cam ring.

The brake shoe, 14, is provided with an outer rim, 27, which is of course of an angle corresponding to the outer rim, 18, of the brake drum and supports the brake lining, 28, which is secured to the rim, 27, by riveting or the like. Referring particularly to Figures 4 and 5 it will be noted that the brake shoe, 14, is further provided with a polygonal hub portion indicated at 29 and a relatively thin plate web, 30, which extends between the hub, 29, and the outer rim, 27. Suitable ribs, 31, are integrally formed on either side of the web, 30, for the purpose of not only reinforcing the brake shoe to prevent its buckling, but to provide means within the annular chamber "a", for more readily keeping the air in circulation.

Diametrically opposed recesses, 32, are formed in the brake shoe and are each provided with an angularly disposed beam portion, 33, and a wall portion, 34.

The angular surface, 33, extends from a point, 35, which is on the approximate level with the edges of the rim, 27, and the hub, 29, inwardly to the points of its lowest depths as indicated at 36. This structure of course necessitates the solid portion, 37, thereby providing a very rigid construction as to withstand the maximum amount of wear. The angle of inclination of the surface, 33, may of course vary depending upon the weight of the machine and the diameter and width of the brake band.

A movable member or cam ring, indicated generally as at 15, is formed in two sections, 38 and 39, which are bolted together through the enlarged lugs, 40, by means of suitable bolts, 41. The central opening, 42, of the movable member, 15, is preferably machined at assembly so as to present a relatively smooth and circular opening so that this cam ring may freely rotate within the space or groove, 24, previously referred to.

The cam ring, 15, is provided with a pair of diametrically opposed and outwardly extending lugs or projections, 43, whose outer cam surfaces, 44, are of the same angle or inclination as are the surfaces, 33, of the brake shoe, 14.

For the purpose of strengthening the cam ring adjacent to the lugs, 43, I provide these rings with integrally increasing width as clearly indicated at 45. Since the surface of the cam ring adjacent to the plate, 22, is in direct contact with it a maximum amount of pressure may be exerted upon the brake shoe with the minimum amount of strain upon the cam ring, as is clearly shown in Figure 7. The relative movement between the brake shoe, 14, and the movable member or cam ring, 15, is clearly shown by dotted lines in Figure 5.

For the purpose of causing the relative movement between the brake shoe and the cam ring, the section 39 of the ring is provided with a slightly enlarged portion in which is located a radial slot, 46, which is adopted for engagement by the means of the pin, 47, located near the outer end of the relatively short lever, 48. The lever, 48, is of course preferably integrally formed with the operating shaft, 16, which is in turn freely rotatable within the bearing, 49, carried by the plate, 13.

For the purpose of assuring disengagement between the slidable brake shoe, 14, and the brake drum, 11, I provide a pair of coil springs, 50, which are preferably located between the ribs, 31, and the plate, 22, of the inner drum as is clearly shown in Figures 2 and 7.

Having thus described the details of my invention the operation thereof will be very apparent. By slightly turning or rocking the shaft, 16, in a direction indicated by an arrow in Figure 2, the pin, 47, oscillates the cam ring and causes the oppositely disposed lugs, 43, to bear against their mating surfaces, 33, formed in the brake shoe, 14. The brake shoe being provided with substantially large bearings will now slide axially along the centrally disposed polygonal projections, 25, until the brake lining, 28, carried by the brake shoe is in contact with the rim, 18, of the brake drum, 11.

It will be obvious that with a brake of this description the entire area of the outer portion of the lining is in direct contact with the adjacent portion of the brake drum thereby producing the maximum amount of braking pressure but with a slight exertion or movement of the operating rod, 16. Then, too, it will be noted that by this novel construction I present an unusually large bearing surface for the slidable brake shoe which together with the location of the wedging or camming means eliminates all chance of any possible wedging or binding between the hub, 29, of the brake shoe and its respective bearing, 25.

Instead of necessitating the usual tying up of the motor vehicle while the brake bands are being relined, it will be readily seen that this may be easily eliminated with a device of this construction. In this instance completely lined brake drums may be readily kept in stock thereby only becoming necessary to replace the worn brake drum for a relined one.

I claim:

1. A brake, comprising a wheel member, a conical brake drum carried thereby, an axle for said wheel, an inner drum secured to the axle and having a centrally disposed polygonal support, a brake shoe slidably mounted with respect to the polygonal support, the polygonal support for the slidable brake shoe being substantially one-half the diameter of said brake shoe and disposed to surround the axle in concentric spaced relation and a movably mounted member having a plurality of cam surfaces adapted to bear against the said brake shoe for effecting the braking action.

2. A brake comprising, a wheel carried drum, an axle carried drum disposed internally of said wheel drum in concentric relation thereto, a cover plate carried by one of said drums over the open inner end of the brake, said axle drum having a hub portion formed with an irregular peripheral contour, a brake shoe slidably mounted over said hub and having a bearing portion of similar contour to prevent relative rotation of said shoe and hub, an annular guide on said axle drum, an actuating ring rotatable over said axle drum between said guide and cover plate and retained thereby against movement axially of the drum, and means on said ring for moving said brake shoe axially over said hub portion on rotation of said ring.

3. A brake comprising, a wheel carried drum, an axle carried inner drum of lesser diameter and concentric therewith, a radial cover flange on said inner drum and extending between said inner drum and the periphery of said wheel carried drum, a tubular hub member secured over said inner drum and having a radial attaching flange secured to said cover flange, a radial guide flange formed on said hub member in spaced relation parallel to said attaching flange, said hub member having a polygonal formation outwardly from said guide flange, a brake shoe slidable thereover axially of the drums and having a polygonal bearing thereon to prevent relative rotation, means retained between said guide and attaching flanges for rotation over said hub member to move said brake shoe axially into braking engagement with said wheel drum, and means connected between said brake shoe and cover flange for effecting releasing movement of said brake shoe.

4. A brake comprising a wheel-carried drum having a conical braking face, an axle carried drum shaped to form with the wheel-carried drum a substantially closed annular chamber surrounding the axle in concentric spaced relation and which is relatively spacious to facilitate heat dissipation, a brake shoe annulus supported for axial movement on the axle-carried drum and in the said chamber, said axle-carried drum and said brake shoe annulus having cooperating non-circular bearing surfaces, and said axle carried drum having an annular bearing groove, and a cam ring mounted in the groove and movable in engagement with the brake shoe annulus to cause the latter to engage the braking face of the wheel-carried drum for the purpose described.

HOWARD A. MONTEITH.